July 29, 1969    J. K. TRUITT    3,458,357
FUEL CELL BATTERIES
Filed Jan. 8, 1964    3 Sheets-Sheet 1

INVENTOR.
James K. Truitt
BY William D. Harris, Jr.
Attorney

July 29, 1969

J. K. TRUITT 3,458,357

FUEL CELL BATTERIES

Filed Jan. 8, 1964

INVENTOR.
James K. Truitt
BY William D. Harris, Jr.
Attorney

United States Patent Office 3,458,357
Patented July 29, 1969

3,458,357
FUEL CELL BATTERIES
James K. Truitt, Dallas, Tex., assignor to Texas Instruments Incorporated, Dallas, Tex., a corporation of Delaware
Filed Jan. 8, 1964, Ser. No. 336,515
Int. Cl. H01m 27/00
U.S. Cl. 136—86                                19 Claims

ABSTRACT OF THE DISCLOSURE

Disclosed are fuel cell batteries having series cell structure comprising a continuous partition wall with at least two adjacent segments. Each of the segments has a porous oxidizer electrode and a porous fuel electrode separated from the oxidizer electrode. The oxidizer and fuel electrodes form sides on electrolytic compartment adapted to contain an electrolyte. Various structures are disclosed for physically and electrically interconnecting the cell structures and for supplying oxidizers, fuels and electrolytes to the cells.

---

This invention relates to fuel cell batteries.

Individual fuel cells have been the result of intensive investigation in the last several years. Many types of different fuel cells have been tested and, to a limited degree, used in actual batteries. While some of these batteries have been functional for a period of time, they have, in general, had various shortcomings. A significant shortcoming has been that fuel cell batteries of the prior art have had relatively low power outputs for the space they occupy. In the vocabulary of the art, this is referred to as low power density.

Another significant shortcoming of the prior art has been the cumbersome arrangements required to provide conducting paths from the electrodes of opposite polarity within a fuel cell, or battery, as the case may be, leading to a suitable location external of the cell to provide external terminals for hookup of an external load.

Yet another shortcoming of the prior art has been the difficulty of providing satisfactorily sealed fuel cells that will effectively contain electrolyte without elaborate, complex, and expensive provision being made for sealing.

Still other shortcomings in the prior art include the complexity and expense of parts required, the multiplicity of dissimilar parts required, and the difficulties of assembly of parts into a fuel cell battery.

Another shortcoming of the prior art has been inadequate provision to supply additional electrolyte as needed, to cells, particularly to those operating on molten electrolyte at high temperature.

Accordingly, it is an object of this invention to overcome those stated difficulties of the prior art.

More specifically, it is an object of this invention to provide for a fuel cell battery of simple, economical, yet effective design and construction which has a high power density.

Moreover, it is an additional object to provide a fuel cell battery system in which the electrolyte is well sealed within cells, yet without the necessity for elaborate provision to accomplish such sealing.

It is an additional object to provide a fuel cell battery in which the internal output electrodes of opposite polarity are provided with a highly efficient and simple conducting path to the exterior of the cell.

Moreover, it is an object to provide a fuel cell battery having a series cell configuration in which the electrical path between series cells is of quite low resistance.

It is an additional object to make provision for efficient supply of electrolyte to the cells of a fuel cell battery.

It is yet another object of the instant invention to provide a fuel cell battery realizing one or more of the objects referred to in the preceding paragraph, yet which battery is adapted for construction in sizes ranging all the way from one cell to a multiplicity of cells in series and/or parallel, and to provide such fuel cell battery having such wide range of sizing capabilities that may be simply, effectively, and economically constructed and assembled.

In accordance with this invention, a series cell structure is provided for use as a partition to separate fluid oxidizer from fluid fuel in a fuel cell battery. The series cell structure comprises a continuous partition wall with at least two adjacent segments. Each of the segments has a porous oxidizer electrode and a porous fuel electrode spaced from the oxidizer electrode. The oxidizer and fuel electrodes form sides of an electrolyte compartment adapted to contain an electrolyte. Each oxidizer electrode forms outer wall structure on one side of the partition wall and each fuel electrode forms opposite outer wall structure on the other side of the partition wall. The oxidizer electrode of one segment and the fuel electrode of the adjacent segment are interconnected by electronically conductive means, and insulated spacing means space and insulate, one from the other, the other electrodes of the two segments.

In a more specific aspect, a second continuous partition wall is provided together with a first continuous partition wall in accordance with the description just given in the preceding paragraph. The second wall partition is parallel to the first partition wall and spaced apart from it. It is made up of two adjacent segments, and is like the other partition wall in all respects except that electrodes defining wall structure of the second partition wall are like electrodes, either fuel or oxidizer electrodes, to the electrodes forming wall structure of the first partition wall. Thus a corridor is defined between the partition walls which is adapted to receive a reactant fluid to react with all of the electrodes forming wall structure for the corridor. In an even more specific aspect, insulated, channeled upper and lower cell supports are provided to receive, and support the upper and lower portions of the partition walls and to provide top and bottom closure. Also, conducting plenums are connected at either end of the parallel partition walls. The plenum at one end provides fuel inlet means, into the corridor, and the plenum at the other end provides fuel outlet means, from the corridor.

In accordance with another aspect, the instant invention provides structure for use in a fuel cell battery having outer insulated casing means. The structure so provided includes the combination of a conducting fluid reactant supply plenum that includes fluid reactant supply means; at least one fuel cell that has a pair of porous, spaced-apart electrodes that form opposite wall structure adapted to contain an electrolyte therebetween and a conducting exhaust plenum including spent reactant fluid exhaust means. The conducting reactant supply plenum abuts against and conductively connects with one of the electrodes and means are provided to electrically interconnect the conducting exhaust plenum with the other electrode. The one electrode which is conductively connected to the reactant supply plenum is insulated from the conducting exhaust plenum and the other electrode is insulated from the conducting reactant supply plenum. With this combination of structure the plenums serve as the terminal busses for the fuel cell battery.

A preferred embodiment of the present invention provides a unit for use in a fuel cell battery which includes at least two pair of porous electrodes, a conducting metal bar in engagement with certain of the electrodes, and insulated spacing means spacing apart and insulating certain of the electrodes. The two pair of porous electrodes comprise an opposed spaced apart first pair of opposite polarity and an opposed spaced apart second pair of opposite polarity. The second pair lies generally adjacent to the first pair. The conducting metal bar is fixedly engaged with one electrode only of the first pair and fixedly engaged with one electrode only of the second pair. The electrodes so engaged by the conducting metal bar are of opposite polarity. The electrodes spaced apart by the insulated spacing means include the first pair, one from the other, and the second pair, one from the other. Moreover, the insulated spacing means insulate from conductive electronic flow each electrode of the two pair of electrodes, one from the other, except for the electrodes engaging the conducting bar. In a more specific aspect, this embodiment includes the disposition of said interconnected electrodes so that end portions overlap to provide opposed portions. The conducting bar is fixedly engaged to the overlap portions of each of these electrodes.

In yet another aspect, the instant invention provides an electrolyte supply system having utility to supply electrolyte to porous structure between the electrodes of a cell. The provision for electrolyte supply includes an electrolyte cavity in the body of a lower insulating support which receives in an elongated channel in its upper face the lower edges of a pair of spaced apart electrodes of at least one fuel cell. The electrolyte cavity extends below the lower edge of the spaced apart electrodes received in the channel and the electrolyte cavity includes structure that defines an opening communicating from said cavity with at least a part of the portion of the lower channel receiving the electrodes. In addition, means providing capillary action to draw electrolyte from the chamber when it is substantially filled are included. A preferred embodiment utilizes a multiplicity of small, porous particles of magnesium oxide to provide the capillary action. As is understood in the fuel cell art, the electrolyte provides "ionic conduction" as distinguished from the terms "electronic conduction," "electrical conduction," and "conduction," the latter three terms being used interchangeably herein.

For a more complete understanding of the present invention and for further objects and advantages thereof, refernce may now be had to the following description taken in conjunction with the accompanying drawings in which.

Figure 1:
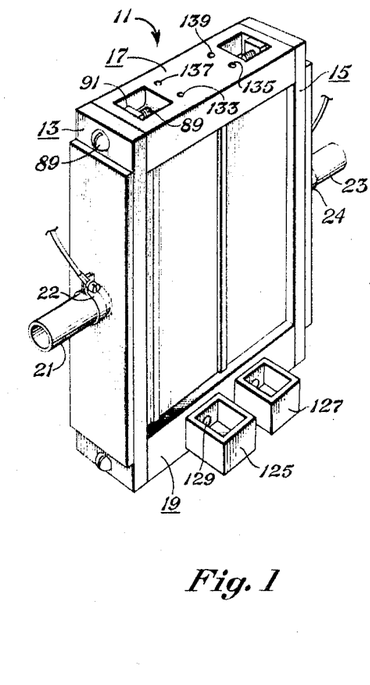
FIGURE 1 is a perspective view of a fuel cell battery unit in accordance with a preferred embodiment of the instant invention.

Attention is now directed to the perspective view of FIGURE 1. Therein is illustrated generally at 11 a fuel cell battery unit that is a preferred embodiment of this invention. Battery unit 11 is made up of two parallel series arrays of two cells each. Such a configuration is sometimes referred to as a "two-by-two" arrangement.

It will be noted that a striking characteristic of the overall appearance of the unit of FIGURE 1 is its general configuration as a rectangular solid. As will be appreciated after the structure of unit 11 is explained, along with other aspects of the instant invention, the compact, rectangular type configuration to which battery construction in accordance with concepts of the preferred embodiments of the instant invention logically leads is quite advantageous since a relatively simple system of high power density can be so constructed. By a system of high power density is meant one occupying a comparatively small amount of space for a comparatively large power output.

Considering the structure of unit 11, visible in FIGURE 1, this box-like unit has as one end the metallic conducting fuel inlet plenum 13. Its opposite end is provided by the metallic conducting fuel outlet plenum 15, which is the same in external apperance as plenum 13. The top of the box-like structure is provided by the upper insulating cell support 17, and the bottom by the lower insulating cell support 19. Both of these cell supports are of a good dielectric material, alumina and lava being satisfactory for this purpose, along with other insulating materials that possess considerable structural strength.

It is thus seen that the opposite metallic conducting plenums 13 and 15, and the opposite upper and lower insulating cell supports 17 and 19, define a rectangular structural frame having parallel-spaced metallic conducting members separated by, and interconnected by, spaced upper and lower parallel non-conductors.

Further referring to FIGURE 1, a fuel inlet tube 21 extends outwardly from the plenum 13. To it is securely engaged the annular electrical terminal 22. A fuel outlet tube 23 extends outwardly from the plenum 15. It has securely engaged to it the electric outlet terminal 24, which is similar in configuration to outlet terminal 22. Electric wires lead from each of the outlet terminals 22 and 24.

The detail of the structure carried by the rectangular frame work of the plenums and the insulated cell supports is best understood by referring to FIGURES 2–5, which all relate to the unit 11. Strucure defining four fuel cells is contained within the framework of unit 11. This includes structure for the fuel cells 25, 27, 29 and 31. The general configuration and arrangement of these fuel cells is such that 25 and 27 extend with end portions in alignment so that a substantially vertical wall is provided by these two cells. Moreover, in similar manner, fuel cells 29 and 31 define a similar wall-like structure which is parallel and spaced from that defined by fuel cells 25 and 27. These walls effectively provide opposite sides to the general box-like structure of unit 11.

Figure 3:
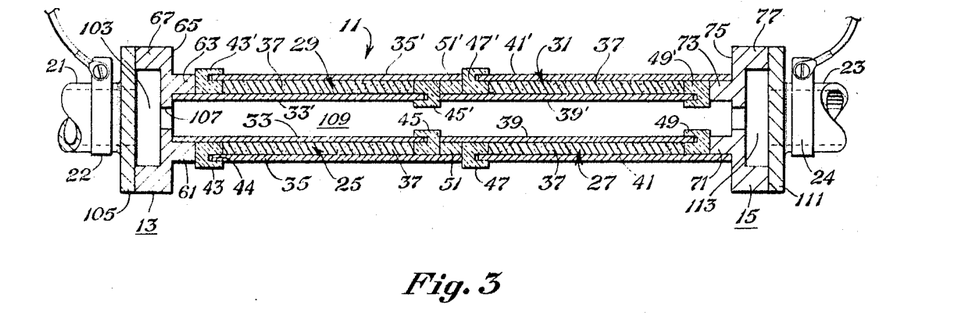
FIGURE 3 is a sectional view taken along 3—3 of FIGURE 2.

Fuel cell 25 has an inner electrode 33, and an outer electrode 35. These electrodes are rectangular, porous plate-like members. They are of an electronically conducting material since they must function as electrodes. Various metals such as silver, nickel, and iron are examples of suitable materials of construction for these electrodes.

Electrodes 33 and 35 are disposed in vertical planes and they are parallel. The space between them is occupied by an electrolyte. The electrolyte may be a free liquid electrolyte or it may be supported in a rigid structural matrix having a multiplicity of pores, for example, a sintered porous plate of magnesium oxide. If a rigid porous matrix is used, preferably the electrodes 33 and 35 will be joined to opposite faces of this matrix by a flame spray technique, a process known in the art.

Unit 11, however, preferably does not utilize either a free electrolyte or one within a rigid structural matrix. Rather, its preferred electrolyte system consists of a liquid electrolyte supported by the capillary action of and dispersed throughout a multiplicity of loose, finely powdered porous particles. In accordance with this concept, magnesium oxide powder of small grain size and high porosity is dispersed between the electrodes 33 and 35. Carried between these electrodes by the particles of magnesium oxide is the electrolyte, which in this preferred embodiment is a eutectic mixture of sodium and lithium carbonate, for example, 50% molar sodium carbonate and 50% molar lithium carbonate. This system of finely divided porous magnesium oxide particles and electrolyte is hereinafter referred to as the electrolyte slurry. It should be borne in mind that this invention should in no sense be construed as limited to this specific electrolyte system, since a variety of others may be used.

The electrolyte slurry is indicated by the reference character 37 throughout its appearance in unit 11, including within each of the cells 25, 27, 29 and 31.

Fuel cell 27 of unit 11 has the same basic configuration as fuel cell 25, with an inner rectangular porous electrode 39 and an outer porous electrode 41 of the same configuration. Electrode 39 is in vertical, end-to-end, but spaced alignment with electrode 33. Likewise, electrode 41 is in vertical, end-to-end, but spaced, alignment with electrode 35. Spacing between and support for electrodes 33 and 35 is provided, in part, by the insulating grooved spacer 43. This member is of a good dielectric material, yet it has considerable structural strength. Lava and alumina are examples of suitable material. Insulating grooved spacer 43 is a vertical member having a regular cross section throughout most of its length, which is generally rectangular in shape, but which includes a groove 44 on one of its edges which receives the end of electrode 35. The width of this groove is such that good lateral support is provided to the received portion of electrode 35, sufficient clearance being present to permit only a tight, sliding engagement of the received portion of the electrode with respect to the groove. The groove has a substantial depth clearance with the extremity of the received portion of the electrode. As will be pointed out in more detail hereinafter this feature is of importance in permitting the necessary differential expansions to occur, which will be encountered with temperaure changes experienced by the unlike materials of unit 11.

Insulating grooved spacer 45 is vertically oriented and has the same configuration as insulating grooved spacer 43. However, it is oppositely oriented in direction so that its grooved portion receives the end of electrode 33, opposite to that end of electrode 35 received by insulating groved spacer 43. With the insulating grooved spacers 43 and 45 so oriented, it will be observed that congruent sides of each lie against side portions of the opposite respective electrode. Note that the spacers 43 and 45 cooperate to space the electrodes 33 and 35 apart in generally parallel fashion.

Insulating grooved spacers 47 and 49 receive and space electrodes 41 and 39, respectively, in analogous manner to that described above for spacers 45 and 43, with respect to electrodes 33 and 35.

Attention is now directed to the manner in which the adjacent sets of opposed electrodes 33 and 35, and 39 and 41, are offset. This can best be understood by reference to FIGURE 3. With the directions taken as they appear on viewing that figure, note that electrode 33 is disposed further to the left than its opposed electrode 35. Moreover, note that electrode 39 is disposed further to the left than its opposed electrode 41. Since the length of these electrodes from end to end is the same in each instance, the result is an overlap between the outer electrode 35 of the cell 25 and the inner electrode 39 of the cell 27. Also note that inner electrode 33 of cell 25 necessarily extends to the left beyond the end of opposed electrode 35 and that outer electrode 41 of cell 27 extends to the right beyond the end of opposed electrode 39.

The metallic vertically elongated conducting bar 51 is joined to the opposite inner faces of each of the overlapping portions of electrodes 35 and 39, as by welding. Metallic conducting bar 51 is rectangular in cross section and its height coincides generally with the height of electrodes 35 and 39. As illustrated in FIGURE 3, it is preferred that the end of the overlapping portion of electrode 35 be flush with the right face of conducting bar 51 and that the end of overlapping portion of electrode 39 be flush with the left face of the conducting bar 51. Since conducting bar 51 is made of a good electronically conducting metal, since it is securely engaged to electrodes 35 and 39 throughout its length, and since its width is comparatively small, very good electronic conduction is provided between the two electrodes 35 and 39 along the short, low resistance path via conducting bar 51.

Figure 4:
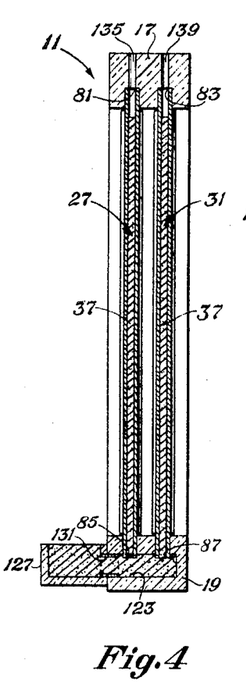
FIGURE 4 is a sectional view taken along 4—4 of FIGURE 2.

As will readily be appreciated from FIGURES 3 and 4, the configuration of fuel cells 29 and 31 is exactly the same in all respects to the configuration of fuel cells 25 and 27, except that the latter are disposed as the mirror image of the former. All of the parts of cells 25 and 27 discussed above (the electrodes, the insulating grooved spacers, and the conducting bar) are symmetrical, except for the insulating grooved spacers, and each of them is shaped so that it can be rotated lengthwise to obtain the mirror image position required. In view of the complete analogy, except for the mirror image aspect, like parts for fuel cells 29 and 31 to those employed in fuel cells 25 and 27 are designated by those same numerals employed in connection with 25 and 27, except those numerals used for fuel cells 29 and 31 are primed.

It is pointed out in connection with the reversibility of analogous parts possible between the two sets of series cells, that, indeed, all analogous parts throughout the cell structure of the various cells are identical and interchangeable. Thus all electrodes are identical as are all insulating grooved spacers and each of the conducting bars.

The fuel cells 25, 27, 29 and 31 are supported between the plenums 13 and 15. Note that the extending portions of electrodes 33 and 33' are welded to the opposite inner faces of spaced vertical bus parts 61 and 63. These spaced vertical bus parts are rectangular projections which extend from the vertical face 65 of plenum body 67. The bus parts are so dimensioned that the extending ends of electrodes 33 and 33' are substantially flush with vertical face 65, while the spacers 43 and 43' on the ends of electrodes 35 and 35' bear against the outer faces of bus parts 61 and 63, respectively. The bus parts 61 and 63, respectively, are preferably welded to the abutting end portions of electrodes 33 and 33'.

In like manner, plenum 15 is joined to the extending end portions of electrodes 41 and 41' by means of spaced vertical bus parts 71 and 73, extending from face 75 of generally rectangular plenum body 77. The bus parts 71 and 73 are preferably welded to the extending end portions of electrodes 41 and 41'.

Figure 2:
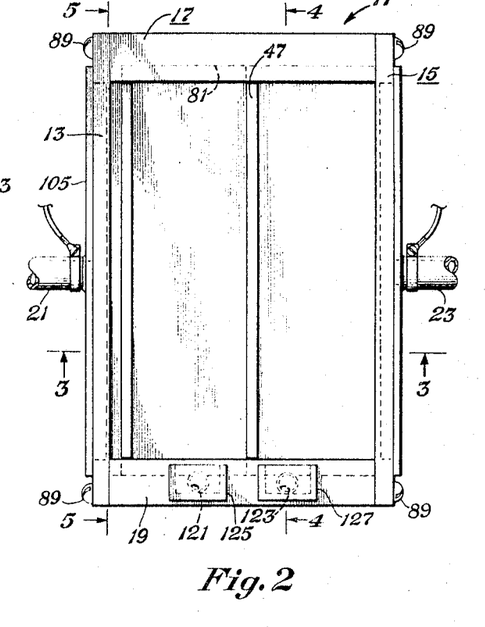
FIGURE 2 is a side view of the unit of FIGURE 1.

Referring to FIGURES 2 and 4, the upper insulating cell support 17 is provided with channels 81 and 83, which are parallel and run the length of insulating cell support 17 from end to end. These channels are of rectangular cross section and open on the bottom face of the respective support member, i.e., the face adjoining the upper portions of cells 25, 27, 29 and 31. These channels are just enough wider than the distance across the electrodes of each cell to provide a tight sliding fit of each electrode therein. The channels 81 and 83 are transversely spaced apart to match the transverse spacing between the aligned fuel cells 25 and 27 and the aligned fuel cells 29 and 31.

The lower insulated cell support 19 has the same general shape as the upper one, and on its upper face, i.e., the one adjoining the lower portion of the cells 25, 27, 29 and 31, a pair of channels 85 and 87 are formed. These channels have the same configuration and spacing as the channels 81 and 83 in the upper insulated cell support 17.

The upper portions of cells 25 and 27 and 29 and 31, respectively, are supported throughout their length within the channels 81 and 83, respectively. In similar manner, the lower portions of the cells 25 and 27, and 29 and 31, respectively, will be supported within channels 85 and 87, respectively. The bus parts 61 and 63 extending from plenum 13 and the bus parts 71 and 73 extending from plenum 15 have the same height as the electrodes. Accordingly, each bus part rides in a respective channel along with the electrode assembly to which it is welded. The upper and lower insulated cell supports 17 and 19 are held in assembled position in respect to the plenums by means of bolts 89. As is seen in FIGURE 1, provision is made in the exposed face of the insulated cell support 17 to receive the end of a bolt 89 and permit its engagement with a nut. This provision consists of a recess 91 in member 17. Similar provision is made for each bolt 89.

The plenum 13 has in its body a rectangular fuel cavity 103 (FIGURE 3) which extends vertically from the level of the top of the lower insulated cell support 19 to the level of the bottom of the upper insulated cell support 17. End cover 105 of the plenum 13 is fastened thereto, as by welding. End cover 105 has an aperture through its mid portion coincident with its intersection with the inner bore of the fuel feed line 21. Thus, communication is provided via inlet 21 into the cavity 103. An elongated slot 107 is formed in wall 65 of the plenum that lies next to the electrode assembly. This slot runs substantially the length of the cavity 103 and is oriented to communicate with the fuel corridor 109, which is the space in between the facing walls defined by inner electrodes of fuel cells 25 and 27 on the one hand and the inner electrodes of fuel cells 29 and 31 on the other.

Figure 5:
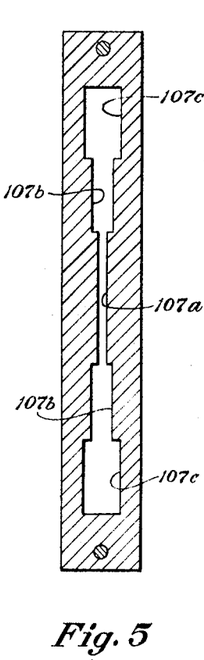
FIGURE 5 is a sectional view taken along 5—5 of FIGURE 2.

Referring to FIGURE 5, it will be noted that the slot 107 is graduated into increasing width as it progresses upwardly and downwardly from its center. Thus, it is comparatively narrow along its central portion 107a; it is expanded in width along portions 107b extending from either end of portion 107a; and finally, it becomes comparatively wide at the end most slot portions 107c. This slot configuration permits a more even distribution of gases entering fuel corridor 109 from cavity 103.

The plenum 15 has an end cover 111 (FIGURE 3) comparable to the end cover 105 of plenum 13. It encloses the rectangular elongated cavity 113 formed within plenum body 77. Wall 75 of the plenum body 77 is slotted to permit communication between the fuel corridor 109 and the plenum body cavity 113. An aperture leading through cover plate 111 communicates with fuel exhaust tube 23. This permits spent fuel to exit from the plenum body cavity 113. It is thus seen that passage is provided for fuel gas from its entrance way via inlet tube 21, past the inner faces of the fuel cells while traversing corridor 109, and finally out through the fuel exhaust tube 23.

As is best illustrated in FIGURES 2 and 4, parallel transverse bores 121 and 123 extend from an outer side of lower insulating cell support 19 to a small distance beyond a point lying below the most distant electrode plate. Bore 121 is disposed in lower insulating cell support 19 below cells 25 and 29. Bore 123 is disposed in lower insulating cell support 19 below cells 27 and 31. These parallel transverse bores 121 and 123 are vertically positioned so that their transverse paths through the insulating support 19 have a common volume of intersection with respect to the lower most portions of the channels 85 and 87. Thus, the extension of the bores above the bottom of the respective channels defines intersections therewith and accordingly, forms slots in the bottom of the channels with a length dependent upon the extent of the overlap of intersection. Such slots permit communication between the bores, hereinafter called electrolyte cavities, and the compartments between the electrodes in which the electrolyte must reside for cell function.

Cups 125 and 127 extend from the side of the lower insulating cell support 19 on which the electrolyte cavities 121 and 123 open. Each of said cups has an aperture, such as 129 in cup 125 (FIGURE 1), that extends through its side which abuts the side of the insulated cell support 19. The aperture is oriented to communicate with the outer opening in the respective electrolyte cavity. Joinder between the cup and bore may be made by a nipple such as nipple 131, which joins cup 127 to lower insulated cell support 19.

To further explain the electrolyte system, fine magnesium oxide power is disposed in each of the four cavities defined between the electrode plates of each cell, in the bores 121 and 123, and in the cups 125 and 127. Electrolyte is provided by filling the respective cups therewith. As the cup is filled, capillary action commences. Capillary action then continues until the electrodes have electrolyte disposed therebetween to an elevation determined by the porous characteristics of the magnesium oxide and the effective level of liquid in the cup. Note that small vertical apertures extend from the channels 81 and 83 all the way through the upper insulated cell support 17. These apertures, 133, 135, 137 and 139, permit communication with the upper portion of the cells 25, 27, 29 and 31, respectively. This assures that atmospheric pressure will prevail in the cells and allow capillary action to continue to its fullest extent.

The pore size associated with the magnesium oxide particles can be varied while the rest of the system remains substantially constant. Consider the equation $$\gamma = \tfrac{1}{2}\, hgdr$$

where $\gamma$ equals surface tension of the liquid; $h$ equals height of the column of the liquid above the lower liquid level; $g$ equals acceleration due to gravity; $d$ equals density of the liquid; and $r$ equals radius of the capillary tube. By rearrangement of the equation, it can be seen that the capillary pore radius is directly proportional to the surface tension of the liquid and inversely proportional to the height of the column, the gravitational acceleration and the liquid density. Consequently, with proper sizing of magnesium oxide particles, the desired amount of capillarity can be obtained for a given electrolyte. The liquid level in the cups 125 and 127 can also be varied somewhat to adjust the elevation of the electrolyte within the cells.

As an example, in a unit 11 where about a seven inch capillary action electrolyte level is desired, magnesium oxide particles having an approximate diameter of 0.005 inch have been satisfactorily used. This provides an effective pore diameter of approximately 0.005 inch.

Attention is now turned away from the structure of the preferred embodiment of FIGURES 1–5 and directed to the function of that embodiment in operation and to an explanation of the electrical and electro-chemical relationships involved.

The unit 11 must be placed within a suitable environment providing a reactant to contact the exposed surfaces of its electrodes 35, 41, 35′ and 41′. If fuel is to be fed into the unit 11 to flow through the fuel corridor 109 separating the inner electrodes 33, 39, 33′ and 39′, then the inner electrodes will serve as fuel electrodes. Hence, the environment for the outer electrode should be that of an oxidizer. The unit 11 will function with various reactants, but the preferred system is hydrogen gas as a fuel feed and a mixture of oxygen and carbon dioxide as an oxidizer feed. The hydrogen may either be pure or may be mixed along with various other gases such as nitrogen, carbon dioxide, carbon monoxide, light hydrocarbons, water vapor, etc. The oxygen may either be pure or may be supplied as air. This system can effectively use various carbonates as electrolytes; but a preferred electrolyte is the eutectic mixture of sodium carbonate and lithium carbonate. Such a mixture, 50% molar sodium carbonate and 50% molar lithium carbonate, has a melting point of about 500° C. It is therefore necessary that the cells be maintained at no less than this temperature. Preferably the gases are introduced hot for reaction at the electrodes. A preferred operating temperature would be in the vicinity of 600° C., and this is a suitable temperature at which to introduce the reactant gases.

Hydrogen gas is passed in through tube 21 and it flows through the fuel cell unit via corridor 109. As it passes through corridor 109, it reacts with electrolyte in contact with electrodes 33, 33′, 39 and 39′. Spent fuel leaves through tube 23. The reaction occurring at the fuel electrodes is as follows:

$$H_2 + CO_3^{--} \rightarrow H_2O + CO_2 + 2e^-$$

Oxygen and carbon dioxide are passed adjacent the exposed surfaces of electrodes 35, 35′, 41 and 41′. At these electrodes, referred to normally as the "air electrodes," the following reaction takes place:

$$\tfrac{1}{2}O_2 + CO_2 + 2e^- \rightarrow CO_3^{--}$$

In connection with such operation of unit 11, it will be appreciated that a supply of oxygen and carbon dioxide must be provided for the air electrodes. For test purposes, placing the unit within an oven which is provided with such a gaseous supply of oxygen and carbon dioxide, or air and carbon dioxide, will suffice, thus providing an outer casing to contain the supplied gas. In practice, such operation would seldom be practical, and therefore other provisions are discussed and illustrated hereinafter whereby unit 11 may be equipped so that a supply of oxygen and carbon dioxide may be received, properly directed, and discharged. The discussion and illustration of such provisions will be deferred until after the electrical function of unit 11 is pointed out.

Both plenums 13 and 15 are made of electronically conductive material. They are separated by dielectrics. Plenum 13 is interconnected with the fuel electrode 33 by means of bus part 61, and to electrode 33′ by means of bus part 63. On the other hand, outer electrodes 35 and 35′, are insulated and spaced from their opposite electrodes 33 and 33′, respectively, by means of insulating grooved spacers 43 and 43′ and by insulating grooved spacers 45 and 45′. Insulating grooved spacers 43 and 43′ also insulate and separate the bus parts 61 and 63 from electrodes 35 and 35′, respectively. Thus, the only path between the opposite electrodes of each of cells 25 and 29 is the path offered by intervening electrolyte 37.

Outer electrode 35 is structurally and electrically connected to inner electrode 39 of the adjacent cell 27 by means of interconnecting electronically conducting bar 51. Similarly, outer electrode 35′ is structurally and electrically connected to inner electrode 39′ of the cell 31 adjacent it via the conducting path provided by conducting bar 51′. Note that insulating grooved spacers 45 and 45′ prevent adjacent inner electrodes 33 and 39, and 33′ and 39′, respectively, from having conductive contact. For cells 27 and 31, the insulating grooved spacers 47 and 47′ assist in preventing an electronic conductive path between the opposed electrode pairs 39 and 41, and 39′ and 41′, respectively, of each cell. The path between these opposite electrodes of each cell must be through the electrolyte.

The insulating grooved spacers 49 and 49′ assist in separating and insulating electrodes 39 from 41 and 39′ from 41′, respectively. In addition they space and insulate electrodes 39 and 39′ from the bus parts 71 and 73, respectively. The extending end portion of the opposite air electrodes 41 and 41′ are welded to the plenum bus parts 71 and 73, respectively. Thus, a path is provided from the air electrodes to the metal plenum 15.

The electrolyte 37 is contained within the structure provided by each cell, and is quite effectively separated from the adjacent cell by means of the integrally connected conducting bars 51 and 51′, assisted by the adjacent insulated spacers 45 and 45′ and 47 and 47′. Note that the electrolyte provided to cells 25 and 29 has the common source of electrolyte bore 121. However, this system is in no way interconnected with the common electrolyte supply provided in cells 27 and 31, via interconnecting bore 123.

In summary, it will be observed that a series hook-up of fuel cells has been provided with fuel cells 25 and 27 in series. Moreover, it will be observed that a second series hookup of cells has been provided with cells 29 and 31 in series. And, finally, it will be observed that these two arrays of series-connected cells have been placed in parallel. Thus, a highly compact and efficient two-by-two fuel cell battery configuration is obtained. The electrical connections of the unit 11 with an external load may be made directly with the opposite polarity plenums 13 and 15, as by connection with any suitable means, such as terminals 22 and 24.

Figure 6:
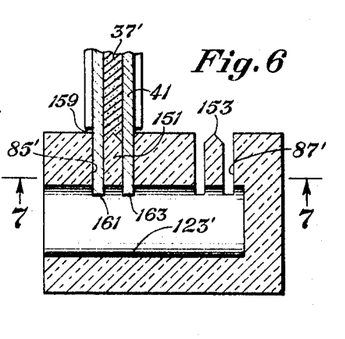
FIGURE 6 is a partial sectional view of an alternative embodiment as it would be seen taken along a section analogous to 4—4 of FIGURE 2, but pertaining to the modified form showing only the lower portions of the section.
Figure 7:
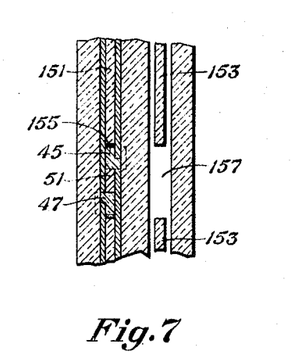
FIGURE 7 is a partial sectional view taken along 7—7 of FIGURE 6.

In some instances, it is desirable to provide auxiliary support in between the opposing electrodes of each cell. If magnesium oxide particles are employed, as was preferred in unit 11, it partially serves this function. In addition, the insulating grooved spacers taken in combination with the integral relationship between adjacent, opposite electrodes of opposite polarity provides considerable support. Auxiliary support may still be desirable in some instances, and can be obtained by providing ridges intermediate each of the channels in the insulated cell supports. Such ridges need not be continuous, but can be broken at strategic intervals, particularly at intervals that will permit the insulated grooved spacer ends by the bus bar to ride in the channels. FIGURE 6 shows a partial section taken through a lower insulated cell support portion of a unit along the same line which section 3—3 was cut, but is applicable to a unit having those changes discussed in the preceding sentence. Thus, referring to FIGURE 6, and to FIGURE 7, it will be seen that a spacing ridge 151 extends axially and centrally along channel 85′ and divides that channel into two spaced channels which will receive the respective ones of the lower portions of electrodes 39 and 41. The width of the dividing ridge 151 is such that the plates are received to provide a close sliding fit. A similar ridge 153 in channel 87′ provides an analogous function to that of spacing ridge 151. Note that the ridges 151 and 153 do not traverse certain intervals in the path along the respective channels 85′ and 87′. Thus, referring to FIGURE 7, it will be noted that in the area of 155 and 157, ridges 151 and 153 are omitted. Within this area of omission, 155, for example, the insulated grooved spacers 45 and 47 and the conducting bar 51 ride on the bottom of the channel 85′. Note that each insulated grooved spacer has its outer portion notched off on either end so that it will fit into the respective channel to receive it. The termination of the outer portion of insulated grooved spacer 47 near its slot inserted end portion is illustrated at shoulder 159, visible behind the sectioned parts in the view of FIGURE 6.

The structure of the embodiment of FIGURE 6 has an electrolyte slurry (with magnesium oxide) 37′ only between the eletcrode plates. The small solid particles of the slurry are held in position by ridges 151 and 153. Electrolyte liquid is provided in the electrolyte cavity 123′ by the intercommunicating electrolyte cup (not illustrated, but exactly like cup 127 of FIGURES 1, 2, and 4) which is maintained to a level so that liquid contacts the lower portion 161 and 163 of the electrodes 39 and 41 that extend into the electrolyte cavity 123. Since these electrodes are porous, the extending portions 161 and 163 provide capillary action to raise electrolyte upward and into the magnesium oxide containing cavity between the electrodes. Thus the electrolyte slurry 37′ is properly maintained.

Figure 8:
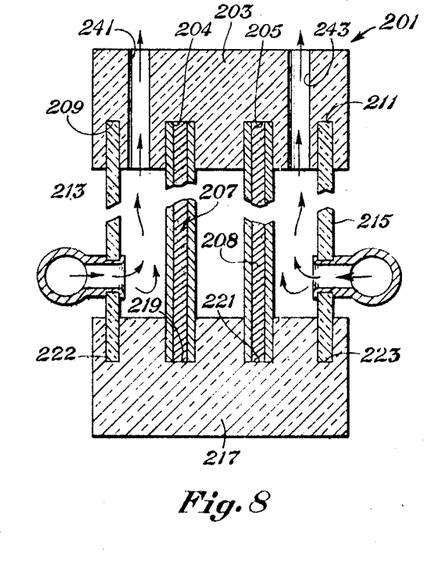
FIGURE 8 is a sectional view of the modified embodiment of FIGURE 9, taken along 8—8 of FIGURE 9.
Figure 9:
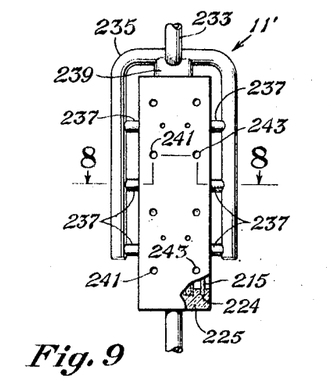
FIGURE 9 is a top view of a modified embodiment.

Unit 201 FIGURES 8 and 9 is quite similar to unit 11, however, an outer casing of a ceramic material is provided to receive and direct air and carbon dioxide. The upper insulated cell support 203 has channels 204 and 205 which receive the upper portions of fuel cells 207 and 208, respectively. In addition, outer channels 209 and 211 are provided to receive and support the upper edges of side casing walls 213 and 215. The lower insulated cell support 217 has channels 219 and 221 supporting the lower portions of fuel cells 207 and 208, and, in addition has outer channels 222 ad 223 which receive and support the lower portions of casing walls 213 and 215. The plenums of fuel cell battery unit 201 are similar to the plenums of unit 11, but they each have spaced apart vertical grooves close to opposite edge portions. These grooves are positioned to receive and support the forward and rear edges of side casing walls 213 and 214. For example, see groove 224 in plenum 225 of FIGURE 9.

Casing walls 213 and 215 are of suitable dielectric material, for example, alumina or lava. Casing walls 213 and 215 have a plurality of openings therethrough to permit intercommunication with the cavity defined between the inner face of the casing walls and the air electrodes and the air manifold system, including air inlet tube 233, which curves downward at its lower end portion as seen in FIGURE 9 to intersect the portion of the U shaped manifold header 235 with which it is connected to convey air therethrough to the manifold connections 237. The fuel outlet 239 (FIGURE 9) also interconnects with the header 235. The respective pressure relationships between the gases are such that the exhaust fuel joins the entering air and both pass through the manifold header and then adjacent the air electrodes of cells 207 and 208, so as to provide reactive contract therewith, and then finally out through vertical exhaust bores 241 and 243 in upper cell support 203. Note that spent fuel provides the necessary carbon dioxide for the air electrode.

The basic unit 11 is qite versatile. A multiplicity of such units may be assembled within a suitable air casing, and provided with an interconnecting manifold for fuel. The result would be to place a large number of two-series cell arrays in parallel.

Figures 10, 11, 11A, 12, 13, 14:
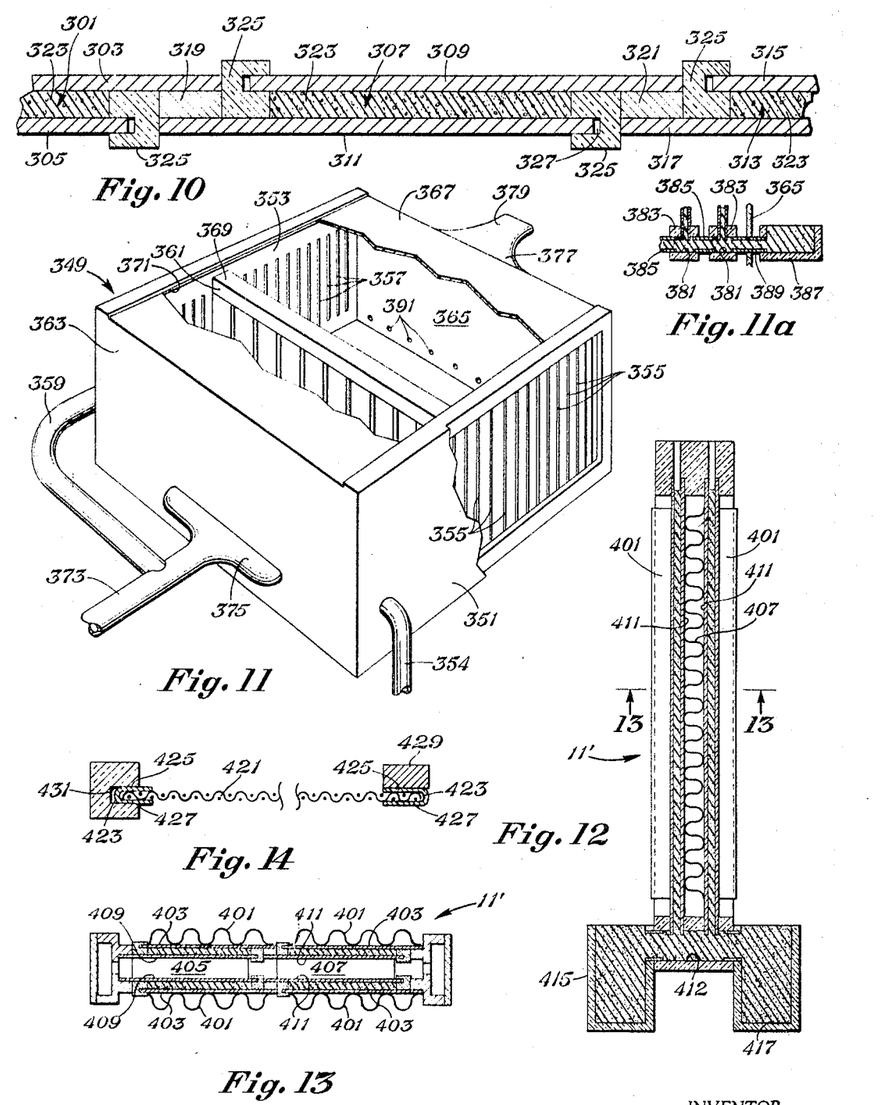
FIGURE 10 is a transverse sectional view through a line of fuel cells assembled in accordance with the instant invention, a partial view of a three-cell series arrangement being illustrated.
FIGURE 11 is a perspective view, partially cut-away, illustrating a large fuel cell battery made in accordance with an embodiment of the present invention.
FIGURE 11a is a transverse sectional view through a part of the structure of the fuel cell battery of FIGURE 11, illustrating the electrolyte feed system thereof.
FIGURE 12 is a sectional view through a modified form of the present invention, taken along a section line analogous to 4—4 on the form of FIGURE 2, but pertaining to the modified form, and illustrating a feature which is a part of an invention claimed in a co-pending application used in combination with the instant invention.
FIGURE 13 is a section taken along 13—13 of FIGURE 12.
FIGURE 14 is a transverse section illustrating a modified embodiment of electrode supported by a vertical insulated spacer and joined to a conducting bar, the view being transverse to the electrode and other structure illustrated.

Moreover, the instant invention is not limited to arrangement whereby only two cells are in series. In accordance with the concept of an interconnecting, spacing conductor bar and complementary spacer means an efficient, economical multi-cell series unit may be constructed. This concept is illustrated in FIGURE 10, which is a partial sectional view through three cells in series. Cell 301 has opposing electrode plates 303 and 305 of opposite polarity. It is in series with cell 307, having opposing electrode plates 309 and 311 of opposite polarity, which in turn is in series with cell 313 having opposing electrode plates 315 and 317 of opposite polarity. Note that the opposing electrode plates, all of the same general size and configuration, are offset so that the plates represented on top as viewed in FIGURE 10 extend to the right beyond their lower opposing plates in each cell. Overlapped portions are thus provided and the conducting bars 319 and 321 join such overlapped portions of adjacent cell plate of opposite polarity to provide a conductive path therebteween. Thus, cell 301 is electronically conductively joined to cell 307 via the conducting bar 319 interconnecting the electrode plates 303 and 311, and the cell 307 is in turn joined to the cell 313, in series arrangement, through the lectronic conductive path offered by the interconnecting conducting bar 321 between electrode plates 309 and 317. A suitable electrolyte, such as a slurry of magnesium oxide and sodium-lithium carbonate eutectic, described in connection with unit 11, is provide in the electrolyte-tight compartments of each of cells 301, 307, and 313. Insulated grooved spacers 325 are provided to electrically insulate and space the electrode plates in manner analogous to that described in connection with the embodiment of FIGURE 1. It is pointed out that these insulated groove spacers assist in making a good electrolyte seal in addition to the spacing and support functions they perform.

While it is not absolutely necessary that the conducting bars, such as 319 and 321, FIGURE 10, be welded or integrally joined to the electrodes they interconnect, it is highly desirable that tight contact be maintained between the overlapping plate ends and the intervening respective conducting bar lest resistance become high or electrolyte loss be promoted through a faulty seal. Moreover, the support provided by integrally connecting plates via a conducting bar is valuable. Thus welding, or otherwise fixedly securing the conducting bars to the electrodes they interconnect, is seen to be the best way to assure that the necessary tight contact is maintained and that structural support is amply provided.

Attention is directed, in FIGURE 10, to the spacing provided between the end of an electrode, such as 311, and the base of the slot in which it slides. The provision of such clearance, indicated at 327 for the specific electrode plate 311, is most important in instances where high temperature operation is involved, as is the case in molten carbonate cells. Over a temperature change of several hundred degrees, the differences in expansion for the ceramic type and the metallic type elements included within a system can become quite large. Accordingly, the clearance 327 permits differential expansion and eliminates the setting up of excessive stresses, and at all times, the sliding support seal type structure involved provides good lateral support and satisfactory sealing with respect to electrolyte.

The conducting bar means that interconnect adjacent cell electrodes of opposite polarity in accordance with the instant invention has been illustrated as a separate bar, preferably joined to the electrodes interconnected by welding. In some instances, the conducting bar means and the two adjacent electrodes it interconnects may be fabricated from a single piece of material. For example, a single sintered metal piece could be fabricated in the desired shape with spaced, parallel end electrode plates and an interconnecting mid-portion.

It will be apparent that the series cell structure of FIGURE 10, whether it consists of three series units or of a multiplicity, may be joined to a conducting bus, similar to bus parts 61 and 71 of unit 11 at either end in acordance with the general conducting plenum concept of FIGURES 1–5. Moreover, it will be apparent that elongated versions of the insulating cell support means of the nature disclosed in FIGURE 1 may be provided for multi-series units.

A fuel cell battery of comparatively large power output is illustrated generally at 349 in FIGURE 11. Therein in perspective is illustrated a box-like structure, having opposite ends defined by inlet fuel plenum 351 and fuel outlet plenum 353. Fuel inlet conduit 354 interconnects a fuel supply cavity internal of inlet fuel plenum 351 with a fuel supply. A plurality of regularly spaced vertical slots 355 lead from the rear wall of inlet fuel plenum 351. A plurality of vertical slots 357 are provided in the inner wall of the outlet plenum opposite the slots 355. Through these slots spent fuel leaves the fuel cells to enter the cavity of the outlet plenum and then exit through spent fuel line 359.

Only one unit 361 is shown in place in the box-like structure of FIGURE 11, in order to simplify the diagram. That unit is substantially the same as the unit 11 except the two parallel lines of series cells are extended, per the manner of the embodiment of FIGURE 10, until a total of two arrays of ten cells each in series are included within each unit. The unit 361 is thus a two-by-ten unit. Twenty units like 361 are assembled within the structure of FIGURE 11 to provide forty parallel sets of 10 cells in series.

The plenums 351 and 353 are conducting and thus serve as busses. Side 363 is a non-conducting material, such as a ceramic, as is the opposite side 365. A bottom, not illustrated, and a top 367 of non-conducting material of a similar nature are also provided. The bottom and top are disposed with a substantial clearance below and above the respective lower and upper insulated cell supports. For example, note the vertical clearance provided between the top extremity of upper insulated cell support 369 and insulated top 367, which is indicated by the vertical distance that top support groove 371, passing lengthwise along the top of plenum 353, lies above upper insulated cell support 369.

Air line 373 leads to manifold 375 in the lower portion of wall 363. Note that spent fuel line 359 joins line 373 prior to the manifold 75. Wall 363 has a suitable opening (not illustrated) which receives the gaseous mixture of air and spent fuel from manifold 75. Recall in this connection that the bottom of the fuel battery of FIGURE 11 is of an isnulating material which extends downwardly a substantial distance below the cell supports to provide an air-carbon dioxide receptacle cavity.

The spacing between individual untis 361 within the large battery is to provide for oxidizer gas flow up between them to allow contact of the oxidizer gas with the air electrodes.

The central top portion of side 365 in the large battery configuration of FIGURE 11 has an outlet manifold 377 which provides for the outlet of spent air-carbon dioxide from the top portion of the large battery unit to the exhaust line 379.

Each unit 361 must be provided with electrolyte for its cells. The electrolyte may be self-contained in each unit if desired; however, this makes it quite difficult to efficiently supply such make-up electrolyte as is needed. Accordingly, the fuel cell battery 359 is preferably equipped with electrolyte supply means that will provide make-up electrolyte, as required, to the various cells in a simple but efficient manner. Such supply means is based on the principle that a common electrolyte may be supplied to all cells of like potential without disturbing the electrochemical and electrical relationships of the battery.

A means of providing electrolyte supply to cells of like potential is illustrated in FIGURES 11a, wherein a pair of adjacent units 361 from fuel cell battery 349 are shown. The unit 361 on the right, as viewed in FIGURE 11a, is the unit nearest the rear side 365 of fuel battery 349. Each unit 361 has an electrolyte bore (electrolyte cavity) 381 in its lower, insulating cell support 383, connecting the two parallel cells of like potential within the unit. The section of FIGURE 11a is taken at a location on units 361 that is analogous to the location where the section of FIGURE 4 was taken on unit 11. The only difference is that the bore 381 (FIGURE 11a), unlike the bore 123 (FIGURE 4), runs all the way through the lower insulating cell support. The bores 381 of adjacent units 361 are interconnected by nipples 385. The unit 381 next to side 365 of fuel cell battery 349 has its bore in communication with supply cup or reservoir 387 via nipple 389, which extends through a nipple receiving aperture in side 365. It is thus seen that cup 387 provides a common electrolyte supply to the aligned, interconnecting electrolyte bores 381 in each of the twenty units within fuel cell battery 349. It will be apparent that such a common supply system can be provided for each of the ten different electrode potentials involved in the fuel cell battery 349. Thus, ten external cups, each communicating with aligned bores interconnecting a common one of the ten different potential cells of each of units 361 is needed. The general location of the line of cups 387, rearward of end 365, can be readily understood by noting the line of cup nipple apertures 391, shown in the lower part of side 365, FIGURE 11. It will be apparent that the units 365 nearest to end 363 will require a stopper means in its bore opening adjacent end 363. Alternatively, this bore opening can be connected via a nipple through end 363 with a second external cup, similar to cup 387 external of the other end 365.

It will thus be apparent that when the large battery 349, of FIGURE 11, is fed air via 373 that the air, together with the carbon dioxide provided by the spent fuel via line 359, will enter the bottom cavity below the various units and flow up between them to contact the air electrodes to permit the air electrode reaction to occur. The spent gases then flow outward through the outlet manifold 377 to exhaust line 379. Moreover, it will be apparent that fuel will pass from fuel inlet conduit 354 into the cavity within plenum 351; thence through the various parallel paths offered by the units 361 to contact the fuel electrodes in each and finally out through the cavity of the plenum 353, to join the inlet air via line 359.

It has been found that the use of electrically active secondary electrodes in conjunction with the primary electrodes of the instant invention is particularly advantageous. That concept is the joint invention of James K. Truitt and Thomas N. Hooper and is covered in copending application Ser. No. 336,721, filed Jan. 9, 1964, entitled Electrodes Having Electrochemically Active Secondary Electrodes. Because of the adaptability of the instant invention for use with such inventive concept, that concept is illustrated in FIGURES 12 and 13. Therein, the unit 11' is like unit 11, previously discussed, except for the additions and changes mentioned herebelow.

Secondary electrodes 401 of corrugated configuration are joined to all of the air electrodes 403 of unit 11'. These corrugated units are of an electrode material which is the same as, or quite similar to, the electrode material of the respective electrode to which the secondary electrodes attach. Thus, if the air electrodes are a sintered silver, either sintered silver or a fine mesh silver wire screen might be utilized as the secondary electrodes. Spot wolding may be used to affix the secondary electrodes 401 to the respective electrodes to which they connect.

The secondary electrodes on the primary air electrodes materially increase effective contact between the electrolyte and the reacting oxidizer gas. The result is increased power output for otherwise comparable situations. Moreover, the secondary air electrodes can be connected to an adjoining secondary electrode of like polarity when a system employing several units in side by side relationship is involved. This materially adds to structural support.

Perhaps of even more importance is the somewhat similar concept of attaching secondary electrodes in between parallel electrodes of like potential. In the unit 11', this takes the form of interconnection of parallel fuel electrodes. In unit 11', corrugated secondary electrodes 401, of like or similar material to the main fuel electrodes 409 and 411, are connected between opposing fuel electrodes of the same potential. Secondary electrodes 401 are affixed, as by spot welding, to the inner opposed surfaces of the parallel fuel electrodes 409 and 411, respectively. It will be noted that the corrugations are disposed at right angles to the direction of the corrugations of secondary electrodes 401 used in connection with the air electrodes and that they provide parallel channels to direct fuel adjacent to the fuel electrode surfaces in such a manner that good contact will be insured. The interconnections of each pair of parallel "mirror-imaged" fuel electrodes by the secondary electrodes 401 effectively increases the size of the electrode means without damaging any other aspect of operation and leads to increased output. Moreover, good structural support is provided by the secondary electrodes.

When a plurality of units of the general nature of unit 11' are assembled into a large battery where an air electrode on one unit will rest beside an air electrode of like potential, secondary electrodes extending from each may be joined to add structural support.

The unit 11' has an electrolyte bore 412 that extends transversely all the way through the lower insulated cell support. Cups 415 and 417 are provided on either side to intercommunicate with the electrolyte bore in similar manner to the provision made in connection with unit 11. Note that the cups 415 and 417 have been extended downward to provide additional electrolyte capacity. The bore, cups, and electrolyte compartments of each fuel cell are filled with magnesium oxide to provide a capillary matrix supporting the electrolyte.

FIGURE 14 illustrates a slightly different method of mounting an electrode. This method is particularly designed for fine mesh screen wire electrodes. The fine mesh screen wire electrode 421 has elongated U shaped metal clips 423, each with opposing sides 425 and 427 bent together to enclose an edge of screen 421. Similar metal clips (not illustrated) preferably enclose the top and bottom edges of the screen electrode 421 and effectively frame the rectangular screen electrode within the clips. One of the metal clips 423 is welded to the conducting bar 429. The opposite metal clip 423 rides in the vertical insulated spacer. Note the spacing between the end of the clip and the rear of the slot 431 to provide for expansion.

A variety of screen wire mesh sizes may be used for electrodes. For example, in a system based on the design of unit 11, an air electrode of 316 stainless steel, 150 mesh wire grid screen, silver painted, and a fuel electrode of 120 mesh pure nickel wire grid screen may be satisfactorily employed.

It is seen that the metal clips provide a support frame and a convenient mounting means for a fine mesh screen wire electrode. When used with the form of electrolyte feed illustrated in FIGURES 6, and 7, it is desirable that portions of the frame be cut away adjacent electrolyte cavities or bores to permit direct communication between the screen and the electrolyte supply.

It will be observed that the electrodes of this invention have been illustrated in the preferred embodiments as either a sintered mass of particles forming a porous electrode or a fine mesh screen wire. Other methods of construction are possible as long as the end product is a porous electrode of suitable material. It is necessary that the electrode be electronically conducting. Examples of materials suitable for certain systems include silver, nickel, and iron. For the unit 11 disclosed herein, when operated with a molten carbonate electrolyte, it is preferred that the air electrode be silver or a stainless steel painted with silver and that the fuel electrode be nickel or a high nickel content alloy. The thickness of the electrodes of the preferred embodiments is in all cases relatively small compared to their other dimensions. Such a configuration is referred to hereinafter in the claims as "plate-like." It is to be understood that this includes screen wire electrodes as well as other varieties.

It will be seen from the foregoing that this invention provides a fuel cell battery having a high power density. This is partly made possible by the conductive, series interconnecting of adjacent cells to provide a continuous line of series connected cells with no wasted space. Moreover, such line of cells is disposed so that a partition is defined which separates the fuel and oxidizer reactants. In a preferred form, with two similar series lines of cells in parallel, it has been observed that a fuel corridor is defined between the two lines of cells. Fuel can be passed from a suitable fuel supply, such as the plenum of this invention, down the fuel corridor to contact all fuel electrodes in the two lines of series connected cells.

The rectangular construction of the preferred embodiments of the instant invention is an additional factor of importance in making possible high power density fuel cell batteries of simple construction.

It will be observed that a method of interconnecting cells is provided which utilizes a conducting bar to interconnect adjacent fuel cells in series fashion. This conducting bar preferably is fixedly joined to plates of opposite polarity in adjacent cells. In a preferred form, the plates overlap and the conducting bar engages the overlapped portions. By such connection a highly efficient, low-resistance path for electronic conduction between the adjacent plates of opposite polarity is provided. Moreover, the interconnecting conducting bar assists in maintaining separation of electrolyte between the adjacent cells.

It can further be seen that a conducting plenum is provided which has the dual function as a terminal bus for a fuel cell battery and as a means to convey reactant into the unit. A similar conducting plenum is provided as a means of exhausting spent reactant. Thus, external bus terminals are made available for the fuel cell battery. The connections from the cells to the conducting plenum is preferably a direct connection between plates of the proper polarity and the conducting plenums themselves. In a preferred form, at least two parallel lines of cells are utilized. The space bewteen the parallel lines of cells defines a fuel corridor and the plenums provide means to introduce and withdraw fuel and spent fuel, respectively, from this corridor. The interconnection between the parallel lines of series cells and the plenums is made directly between the plenums and plates of proper polarity. Thus parallel electrical connection is provided between series sets of cells and the plenums serve as bus terminals for the battery.

This invention also provides a novel electrolyte system which includes an electrolyte supply cavity and a reservior leading to this cavity. Electrolyte supply is maintained between plates in a preferred form by capillary action of the plurality of small porous particles disposed between the plates.

It will further be observed that a highly versatile system of constructing large fuel batteries from smaller units is provided by this invention. The structure of the individual units is relatively simple and involves a small number of parts. Note that the insulating cell supports provided in an aspect of this invention are interchangeable. Further, note that electrodes are preferably of like configuration and, thus, interchangeable. Note also that the preferred conducting bars are interchangeable.

It should further be observed that the instant invention provides a compact series configuration involving two or more cells in which the interconnecting structure is adapted to function over a wide temperature range, with suitable expansion joints being provided to allow for differenial expansion.

It should also be observed that the structure of the instant invention makes possible a simple but efficient sealing of electrolyte within the various individual cells. Thus sealing is accomplished without special seals. It is particularly effective in molten carbonate electrolyte systems, such as the 50%–50% molar sodium-lithium carbonate euteutic, because the high surface tension of the electrolyte cooperates in making a tight seal.

While the unit 11 first illustrated herein as a preferred embodiment of the instant invention involves only a two-by-two cell arrangement, it will be understood, as from FIGURES 10 and 11 and accompanying discussion, that other configurations are quite important. For example, the two-by-ten arrangement illustrated in FIGURE 11 has more practical value for many applications than does the two-by-two unit 11, of FIGURE 1. The number of cells in series in a unit may vary from two to an arbitrarily selected large number. It will also be apparent that any order of number of parallel rows can be provided in an assembled battery.

While the fuel supply has been illustarted herein as being fed to the corrid or defined between facing sets of fuel electrodes, it will be understood that under some conditions it may be preferred to supply oxidizer to the corridor, in which case the facing electrodes, will be oxidizer electrodes. It should be understood that such change is clearly within the scope of this invention.

Having described the invention in connection with certain specific embodiments thereof, it is to be understood that further modifications may now suggest themselves to those skilled in the art and it is intended to cover such modifications as fall within the scope of the appended claims.

What is claimed is:

1. A series cell structure for use as a partition to separate fluid oxidizer from fluid fuel in a fuel cell battery, said series cell structure comprising:
   a continuous partition wall having at least two adjacent plate-like segments;
   each of said segments comprising a porous oxidizer electrode and a porous fuel electrode spaced therefrom, said oxidizer electrode extending beyond said fuel electrode at one end and said fuel electrode extending beyond said oxidizer electrode at the opposite end;
   said electrodes of each segment forming sides of an electrolyte compartment adapted to contain an electrolyte therebetween;
   each oxidizer electrode comprising outer wall structure on one side of said partition wall and each fuel electrode comprising opposite outer wall structure on the other wall of said partition wall;
   first electrically conducting plenum means connected with said oxidizer electrode at one end of said partition wall,
   second electrically conducting plenum means connected with said fuel electrode at the opposite end of said partition wall; and
   electronically conductive means located between said first electrically conducting plenum means and said second electrically conducting plenum means and said physically and electrically interconnecting said oxidizer electrode extending beyond said fuel electrode of one segment with said fuel electrode extending beyond said oxidizer electrode of the adjacent segment; said fuel electrode of said one segment and said oxidizer electrode of said adjacent segment being electrically insulated from each other and from said electronically conductive means.

2. A series cell structure for use as a partition to separate fluid oxidizer from fluid fuel flowing in their respective corridors in a fuel cell battery, said series cell structure comprising:
   a continuous partition having at least two adjacent plate-like segments in substantially end-to-end alignment;
   each of said segments comprising a porous oxidizer electrode and a porous fuel electrode transversely spaced therefrom, said oxidizer electrode extending beyond said fuel electrode at one end and said fuel electrode extending beyond said oxidizer electrode at the opposite end;
   said electrodes of each segment forming sides of an electrolyte compartment adapted to contain an electrolyte therebetween;
   each oxidizer electrode comprising outer wall structure adapted to define a portion of said corridor for said fluid oxidizer on one side of said partition wall and each fuel electrode comprising opposite outer wall structure adapted to define a portion of said corridor for said fluid fuel on the other side of said partition wall;
   first electrically conducting plenum means connected with said oxidizer electrode at one end of said partition wall;
   second electrically conducting plenum means connected with said fuel electrode at the opposite end of said partition wall; and
   electronically conductive flat bar located between said first electrically conducting plenum means and said second electrically conducting plenum means directly interconnecting both physically and electrically said oxidizer electrode extending beyond said fuel electrode of one segment and said fuel electrode extending beyond said oxidizer electrode of said adjacent segment, said fuel electrode of said one segmnet and said oxidizer electrode of said adjacent segment being electronically insulated from each other and from said electronically conductive flat bar.

3. The series cell structure of claim 2 in which each of said electrodes is a sintered electrode.

4. The series cell structure of claim 3 in which each of said electrodes is a fine mesh screen wire electrode.

5. In a fuel cell battery, including insulating casing means, the combination of:
   first and second fuel cells, each cell comprising a pair of porous, transversely spaced-apart, rectangular, plate-like electrodes forming opposite wall structure adapted to contain an electrolyte therebetween;
   said cells being transversely and oppositely spaced-apart to form a corridor therebetween and said cells being disposed with their electrodes so configured and arranged that the electrodes of one cell are disposed substantially as the mirror image of the electrodes of the other cell;
   an electrical conductive reactant supply plenum, including fluid reactant supply means for supplying fluid reactant to said corridor;
   said reactant supply plenum electrically connecting with one electrode of the first cell to permit conductive electronic flow between said supply plenum electrically and said one electrode;
   said reactant supply plenum connecting with the electrode of the second cell that is the mirror image of said one electrode to permit conductive electronic flow between said plenum and said electrode of the second cell;
   an electrical conductive exhaust plenum opposite said reactant supply plenum having structure defining spent reactant fluid exhaust means, communicating with said corridor for withdrawing fuel therefrom;
   means for providing a first series electrical path between said exhaust plenum and the other electrode of said first cell and a second series electrical path between said exhaust plenum and the electrode of the second cell that is the mirror image of said other electrode of said first cell;
   insulating means electrically separating said one electrode of said first cell and separating said electrode of said second cell that is the mirror image of said one electrode of said first cell from said exhaust plenum; and
   insulating means separating said other electrode of said first cell from said reactant supply plenum and separating said electrode of said second cell that is the mirror image of said other electrode of said first cell from said reactant supply plenum,
   whereby said plenums serve as opposite polarity terminal busses for the cells in electrical parallel arrangement in a fuel cell battery, and also provide for reactant flow through the cells.

6. In a fuel cell battery, including insulated casing means, the combination of claim 5:
   in which said first series electrical path between said exhaust plenum and the other electrode of said first cell includes at least one additional fuel cell in series with said first cell and in end-to-end alignment therewith to form a first series array;
   in which said second series electrical path between said exhaust plenum and the electrode of the second cell that is the mirror image of said other electrode of said first cell includes at least one additional fuel cell in series with it and in end-to-end alignment therewith to form a second series array;

said first and second series array being held substantially in parallel relationship by said plenums and electrically connected in parallel by having said one electrode and its mirror image electrode of said first cell connected with the reactant supply plenum and by having the electrode of polarity opposite that of said one electrode and its mirror image electrode of said additional cell connected with said exhaust plenum.

7. In a fuel cell battery, including insulating casing means, the combination of claim 6:
in which said reactant supply plenum is directly, fixedly engaged to the one electrode of a first polarity of the first cell and its mirror image electrode of said first polarity in the second cell, said other electrode of the opposite polarity in said first cell and its mirror image electrode of said opposite polarity extend beyond said one electrode and its mirror image electrode in a direction away from said reactant supply plenum;
in which each of said additional cells comprise a pair of porous, transversely spaced-apart, plate-like, rectangular electrodes forming opposite wall structures adapted to contain an electrolyte therebetween, the electrodes of said first polarity extend slightly beyond the electrodes of said opposite polarity in a direction toward said reactant supply plenum, and said electrodes of said opposite polarity extend slightly beyond said electrodes of said first polarity in a direction away from said reaction supply plenum; and
in which said exhaust plenum is directly, and fixedly engaged to an electrode said opposite polarity in the last cell of a series array; and its mirror image electrode and in which said other electrodes of said opposite polarity in said first and additional cells in each series array extending, respectively, beyond said electrodes of said first polarity, are electrically connected within each said series array with said electrodes of said first polarity extending beyond said electrode of said opposite polarity in the adjacent cell.

8. In a fuel cell battery, the combination of:
a first vertical wall having opposite sides, one side comprising a first vertical line of electrodes and the other side comprising a second line of electrodes;
said first line of electrodes comprising at least a first electrode and a second electrode lying adjacent, in end-to-end alignment;
said second line of electrodes comprising at least a first electrode and a second electrode lying adjacent in end-to-end alignment;
said first line of electrodes and said second line of electrodes being parallel and transversely spaced apart to provide an electroylte chamber therebetween;
the electrodes in said first line and the electrodes in said second line being disposed in opposing fashion so that a comparatively large portion of the first electrode in the first line lies directly opposite a comparatively large portion of the first electrode in the second line and a comparatively small portion of the first electrode in the first line lies opposite a comparatively small portion of the second electrode in the second line;
a metallic conductive bar interconnecting opposite comparatively small portions of the first electrode of the first line and of the second electrode of the second line;
insulating means separating the first and second electrodes in each line and electrically insulating said metallic conductive bar from said first electrode in said second line of electrodes and from said second electrode in said first line of electrodes;
first insulated spacer means between the first electrode of the first line and the first electrode of the second line; and
second insulated spacer means between the second electrode of the first line and the second electrode of the second line.

9. A fuel cell battery comprising:
a first vertical wall having opposite sides, one side comprising a first vertical line of electrodes and the other side comprising a second line of electrodes;
said first line of electrodes comprising at least a first electrode and a second electrode lying adjacent, in end-to-end alignment;
said second line of electrodes comprising at least a first electrode and a second electrode lying adjacent, in end-to-end alignment;
said first line of electrodes and said second line of electrodes being parallel and transversely spaced apart to provide an electrolyte chamber therebetween;
the electrodes in said first line and the electrodes in said second line being disposed in opposing fashion so that a comparatively large portion of the first electrode in the first line lies directly opposite a comparatively large portion of the first electrode in the second line and a comparatively small portion of the first electrode in the first line lies opposite a comparatively small portion of the second electrode in the second line;
a metallic conductive bar joined to and interconnecting opposite comparatively small portions of the first electrode of the first line and of the second electrode of the second line and electrically insulated from said second electrode of the first line and from said first electrode of the second line;
a first insulating spacer disposed between the first and second electrodes in the first line;
a second insulating spacer disposed between the first and second electrodes in the second line; and
said first wall having continuity over the entire span of said lines of electrodes.

10. A fuel cell battery comprising:
a first vertical wall having opposite sides, one side comprising a vertical first line of electrodes and the other side comprising a vertical second line of electrodes;
said first line of electrodes comprising at least a first electrode and a second electrode lying adjacent, in end-to-2nd alignment;
said second line of electrodes comprising at least a first electrode and a second electrode lying adjacent, in end-to-end alignment;
said first line of electrodes and said second line of electrodes being parallel and transversely spaced apart;
the electrodes in said first line and the electrodes in said second line being disposed in opposing fashion so that a comparatively large portion of the first electrode in the first line lies directly opposite a comparatively large portion of the first electrode in the second line and a comparatively small portion of the first electrode in the first line lies opposite a comparatively small portion of the second electrode in the second line;
a metallic conducting bar joined to and interconnecting opposite comparatively small portions of the first electrode of the first line and of the second electrode of the second line;
insulating means separating said metallic conducting bar from the second electrode in the first line and from the first electrode in the second line;
first insulating spacer means between the first electrode of the first line and the first electrode of the second line;
second insulating spacer means between the second electrode of the first line and the second electrode of the second line;
a second vertical wall transversely spaced from and parallel to the first wall and having the same structure and configuration as the first wall, including said insulating means and said first and second insulating spacer means, but being interchanged in space so that said second wall is configured and arranged as the mirror image of said first wall;

an upper insulating cell support having a lower face with structure defining a pair of parallel channels on its lower face, each of said channels receiving in a sliding fit the upper end portions of one of said walls;

a lower insulating cell support having an upper face with structure defining a pair of parallel channels, each of said channels receiving in a sliding fit the lower portion of one of said walls, said lower insulating cell support lying opposite said upper insulating cell support;

an upstanding conductive metallic reactant feed plenum with its upper portion connected to one end of the upper insulating cell support and with its lower portion connected to a corresponding end portion of the lower insulating cell support, said reactant plenum being electrically connected to the second electrode of the second line of electrodes in the first wall and also being electrically connected to that electrode in the other wall that is the mirror image of the electrode in the first wall to which said reactant plenum is joined;

said plenum comprising a casing defining a reactant feed cavity with an opening placing said cavity in communication with the space between said first wall and said second wall;

an upstanding conductive metallic exhaust plenum opposite said reactant plenum and with its upper portion connecting to the other end of the upper insulating cell support and with the lower portion of said exhaust plenum connecting to the corresponding other end of the lower insulating support;

said second conductive plenum further comprising a casing defining a spent reactant exhaust cavity and an opening in the rear wall of said plenum interconnecting said reactant exhaust cavity and the space between said first wall and said second wall.

said exhaust plenum being engaged with the last electrode of the first wall which is opposite to that electrode in the first wall connected to the said reactant plenum, and said exhaust plenum being engaged with the last electrode in the second wall which is opposite to that electrode in the second wall engaged by said reactant plenum;

whereby a fluid reactant may be passed into said reactant plenum, thence through the corridor between the first and second walls, and finally exit through the said exhaust plenum, and when said space between corresponding numbered plates of each line of electrodes is filled with electrolyte and a compatible reactant is supplied to the outer facing portions of the first and second walls, a voltage will be generated with the reactant plenum serving as a bus for one terminal and the exhaust plenum serving as a bus for the opposite terminal.

11. In a fuel cell battery having at least one fuel cell, comprising a pair of spaced-apart, plate-like, porous electrodes and insulating upper support means providing a top closure for said electrodes, in combination with said fuel cell:

a lower insulating cell support having an upper surface including structure defining an elongated channel, said elongated channel receiving the lower edge of said pair of spaced-apart electrodes, said lower insulating cell support having structure forming an electrolyte cavity adapted to contain only a single electrolyte in a body thereof, which cavity extends below the lower edge of said spaced-apart electrodes received in said channel and includes an opening communicating with at least a part of the portion of said lower channel receiving said electrodes; and means providing capillary action to draw electrolyte from said cavity and upward in between said electrodes.

12. The combination of claim 11, further comprising reservoir means external of, and interconnecting with, said lower insulated cell support for containing and supplying electrolyte to said electrolyte cavity.

13. The combination of claim 11, in which said means providing capillary action comprises a plurality of small particles of loose material forming a porous media disposed between said spaced-apart electrodes.

14. The combination of claim 13 in which said particles are magnesium oxide.

15. The combination of claim 13 in which said means providing capillary action further comprise the ends of said porous electrodes.

16. The combination of claim 15 further comprising a cup-like electrolyte reservoir in flow communication with said electrolyte cavity.

17. A fuel cell battery system comprising:
(A) a plurality of units, each comprising:
a first vertical wall having opposite sides, one side comprising a vertical first line of electrodes and the other side comprising a vertical second line of electrodes;
said first line of electrodes comprising at least a first electrode and a second electrode lying adjacent, in end-to-end alignment;
said second line of electrodes comprising at least a first electrode and a second electrode lying adjacent, in end-to-end alignment;
said first line of electrodes and said second line of electrodes being parallel and transversely spaced apart;
the electrodes in said first line and the electrodes in said second line being disposed in opposing fashion so that a comparatively large portion of the first electrode in the first line lies directly opposite a comparatively large portion of the first electrode in the second line and a comparatively small portion of the first electrode in the first line lies opposite a comparatively small portion of the second electrode in the second line;
a metallic conducting bar joined to and interconnecting said comparatively small portion of the first electrode of the first line with said opposite comparatively small portion of said second electrode of the second line;
insulating means separating the first and second electrodes in each line and electrically insulating said metallic conducting bar from said first electrode in said second line of electrodes and from said second electrode in said first line of electrodes;
first insulating spacer means between the first electrode of the first line and the first electrode of the second line;
second insulating spacer means between the second electrode of the first line and the second electrode of the second line;
a second vertical wall transversely spaced from and parallel to the first wall and having the same structure and configuration as the first wall, including said insulating means and said first and second insulating spacer means, but being interchanged in space so that said second wall is configured and arranged as the mirror image of said first wall;
an upper insulating cell support having a lower face with structure defining a pair of parallel channels on its lower face, each of said channels receiving in a sliding fit the upper end portions of one of said walls;
a lower insulating cell support having an upper face with structure defining a pair of parallel channels, each of said channels receiving in a sliding fit the lower portion of one of said walls, said lower insulating cell support lying opposite said upper insulating cell support;

an upstanding conductive metallic reactant feed plenum with its upper portion adjacent to one end of the upper insulating cell support and with its lower portion adjacent to a corresponding end portion of the lower insulating cell support, said reactant plenum being joined to the first electrode of the second line of electrodes in the first wall and also being joined to that electrode in the other wall that is the mirror image of the electrode in the first wall to which said reactant plenum is joined;

said reactant plenum comprising structure defining a reactant feed opening through the plenum into the space between said first wall and said second wall;

an upstanding conductive metallic exhaust plenum opposite said reactant feed plenum and with its upper portion adjacent to the other end of the upper insulating cell support and with the lower portion of said exhaust plenum adjacent to the corresponding other end of the lower insulating support;

said conductive exhaust plenum further comprising structure defining an exhaust opening through said exhaust plenum into the space between said first wall and second wall;

said exhaust plenum being electrically connected to the last electrode of the first wall which is opposite to that electrode in the first wall connected to the said reactant plenum, and said exhaust plenum being electrically connected to the last electrode in the second wall which is opposite to that electrode in the second wall electrically connected to said reactant plenum;

said space between corresponding numbered plates of each line of electrodes containing an electrolyte;

whereby a first fluid reactant may be passed through said reactant plenum, thence through the corridor between the first and second walls, and finally exit through the said exhaust plenum, and a compatible second reactant may be passed over the outer facing portions of the first and second walls, and a voltage will be generated with the reactant plenum serving as a bus for one terminal and the exhaust plenum serving as a bus for the opposite terminal;

(B) said plurality of units being disposed so that all of the lines of electrodes of the units are parallel;

(C) said units being spaced apart to provide for passage of a compatible second reactant between adjacent units;

(D) the upstanding, conductive, metallic feed plenums of all units being connected together to permit direct conductive electronic flow therebetween;

(E) the upstanding, conductive exhaust plenums of all units being connected together to permit direct conductive flow therebetween;

(F) insulated casing means cooperating to enclose said units and adapted to confine said compatible second reactant; and (G) means to introduce and exhaust said compatible second reactant.

18. The fuel cell battery system of claim 17, wherein said reactant feed plenums are all integrally joined to form one integrated feed plenum member and wherein said exhaust plenums are all integrally joined to form one integrated exhaust plenum member.

19. The fuel cell battery system of claim 17 further comprising separate, common, electrolyte supply means for each group of electrode pairs serving as fuel cells at a common potential.

References Cited

UNITED STATES PATENTS

| | | | |
|---|---|---|---|
| 3,311,504 | 3/1967 | Johnson | 136—86 |
| 409,365 | 8/1889 | Mond et al. | 136—86 |
| 2,969,315 | 1/1961 | Bacon | 136—86 |
| 3,147,149 | 9/1964 | Postal | 136—86 |
| 3,167,456 | 1/1965 | Schilke et al. | 136—90 |
| 3,202,547 | 8/1965 | Rightmire et al. | 136—86 |
| 3,216,911 | 11/1965 | Kronenberg | 136—86 X |

WINSTON A. DOUGLAS, Primary Examiner

HUGH FEELEY, Assistant Examiner